(12) United States Patent
Horst et al.

(10) Patent No.: US 9,380,042 B2
(45) Date of Patent: Jun. 28, 2016

(54) METHOD FOR OPERATING A NETWORK DEVICE

(75) Inventors: Matthias Horst, Bochum (DE); Michael Ernst, Dortmund (DE)

(73) Assignee: EHT Vermogensverwaltung UG, Bochum (DE)

( * ) Notice: Subject to any disclaimer, the term of this patent is extended or adjusted under 35 U.S.C. 154(b) by 32 days.

(21) Appl. No.: 14/131,814

(22) PCT Filed: Jul. 3, 2012

(86) PCT No.: PCT/EP2012/062907
§ 371 (c)(1),
(2), (4) Date: Mar. 27, 2014

(87) PCT Pub. No.: WO2013/007555
PCT Pub. Date: Jan. 17, 2013

(65) Prior Publication Data
US 2014/0298429 A1   Oct. 2, 2014

(30) Foreign Application Priority Data
Jul. 11, 2011   (DE) .......................... 10 2011 107 586

(51) Int. Cl.
*G06F 7/04* (2006.01)
*H04L 29/06* (2006.01)
*G06F 21/35* (2013.01)
*G06F 21/44* (2013.01)

(52) U.S. Cl.
CPC .............. *H04L 63/08* (2013.01); *G06F 21/35* (2013.01); *G06F 21/44* (2013.01); *H04L 63/0876* (2013.01)

(58) Field of Classification Search
None
See application file for complete search history.

(56) References Cited

U.S. PATENT DOCUMENTS

| | | | |
|---|---|---|---|
| 8,054,485 B2 * | 11/2011 | Berglin | 358/1.15 |
| 8,879,994 B2 * | 11/2014 | Brown et al. | 455/41.3 |
| 2005/0114520 A1 * | 5/2005 | White et al. | 709/228 |
| 2009/0299788 A1 * | 12/2009 | Huber et al. | 705/7 |
| 2010/0294835 A1 * | 11/2010 | Bam | G06Q 20/28 235/382 |
| 2011/0085196 A1 * | 4/2011 | Liu | G06F 3/1204 358/1.15 |

FOREIGN PATENT DOCUMENTS

| | | |
|---|---|---|
| EP | 1320009 | 6/2003 |
| WO | 2011075825 | 6/2011 |

* cited by examiner

*Primary Examiner* — Brandon Hoffman
(74) *Attorney, Agent, or Firm* — Honigman Miller Schwartz and Cohn LLP (57) ABSTRACT

The invention relates to a method for releasing a network device of a network system that comprises at least the one network device and at least one server. At least one second identifier that is assigned to a mobile computing device is stored in a database of the server. The method has the steps of detecting a first identifier, which is installed on the network device to be released, using the mobile computing device; transmitting the detected first identifier and a second identifier, which is assigned to the detecting mobile computing device, from the mobile computing device to the server; comparing the transmitted second identifier with the at least one second identifier stored in the database; and releasing the network device by means of the server if the result of the check is positive.

16 Claims, 3 Drawing Sheets

FIG. 3

METHOD FOR OPERATING A NETWORK DEVICE

CROSS REFERENCE TO RELATED APPLICATION

This U.S. patent application claims benefit of PCT Application No. PCT/EP/2012/062907, filed on Jul. 3, 2012, which claims the benefit of German Application No. DE 10 2011 107586.4 filed on Jul. 11, 2011, which is hereby incorporated by reference in its entirety.

BACKGROUND

The invention relates to a method for releasing a network device of a network system which comprises at least the one network device and at least one server, wherein at least one second identifier assigned to a mobile computing device is stored in a database of the server. Further the invention relates to a method for registering a mobile computing device in a network system with at least one network device and at least one server. In addition the invention is related to a computer program and a computer program product.

In many companies, but also in the private sector, network systems are increasingly used for connecting different electric devices with each other. A network system may, for example, comprise one or more servers and a plurality of client computers which can communicate with each other via a wireless and/or a wired network. Apart from these network devices a network system may also comprise resources which can be shared by the client computers, such as printing devices, scanning devices or such like. Furthermore a network system may comprise further resources used directly by a user, such as copiers or fax machines. It is understood that one or more multi-function devices may be present in a network system which comprise different functions within one device. For security reasons it may be necessary, however, for the network devices to be secured, i.e. protected or blocked. A secured network device is understood to be a device which is allowed to be operated by only an authorized user.

In order to ensure this, a network device has to go through a process of being released. Prior to releasing it a check may be performed to ensure that a user is authorized to use a network device or a function of the network device.

In order to check an authorization of a user it is known from the state of the art that a user, prior to performing a desired function, must authenticate himself at the network device. For example, it is known to query the user name and the password of the user. The respective data must be manually entered by the user which of necessity involves certain actions. In addition unauthorized users may watch the authorized user as he enters this data, i.e. spy on him, thereby posing a considerably security risk.

Alternatively each authorized user may have a smartcard placed at his disposal. This means that the user must initially have himself registered centrally. The smartcard must have a unique key written to it. Furthermore it is necessary for each secured network device to be equipped with a suitable reading device for reading the smartcard. Finally the user must always carry the smartcard with him in order to be able to operate the network device as necessary.

Further, it is known from the state of the art to use mobile computing devices such as a personal digital assistant (PDA) for e.g. securely operating a printing device. As such the DE 102 56 961 B4 discloses a method for secure printing, wherein in a first step an encrypted and/or non-translated print job is sent to a printing device. Using the mobile computing device printing can be made more secure. The user can either transmit a key from his mobile device to the printing device, or the print job can initially be transmitted to the mobile device and decrypted and/or translated by the same. Then the print job can be returned to the printing device for printing and the printing device can be released.

The disadvantage with this state of the art consists in that a communication link must be established between the mobile device and the printing device. To this end the printing device must be provided with appropriate transmitting and receiving means. To this end it is necessary that the mobile device has knowledge of the key with which the print job was encrypted.

SUMMARY

Therefore, the object of the present invention is to provide a method for operating a secured network device, which permits easy registration and/or a simple and, at the same time, secure release of a network device.

The previously derived and stated requirement is met according to a first aspect of the invention with a method for releasing a network device of a network system, which comprises at least the one network device and at least one server, wherein at least one second identifier assigned to a mobile computing device is stored in a database of the server. The method comprises the following steps:

Detecting a first identifier attached on the network device to be released by means of the mobile computing device, Transmitting the detected first identifier and a second identifier assigned to the detecting mobile computing device to the server, Comparing the transmitted second identifier with the at least one second identifier stored in the database, and Releasing the network device by means of the server if the result of the check is positive.

In contrast to the state of the art it is possible to release a secured network device in a simple way by means of a mobile computing device such as a mobile radio device without having to install an additional communication device on the network device or without having knowledge of a secret key of the mobile computing device.

The network system comprises at least one network device, in particular a plurality of network devices and at least one server. The at least one network device can communicate at least with the server via a network.

The network device, in principle, may be any device which can be linked into a network. In particular the one network device is a secured device in which at least one function is blocked to unauthorized users and which must be actively released. Exemplary and non-exhaustive network devices are client computers, printing devices, scanners, copiers and fax machines.

In particular a mobile computing device is used for releasing at least one action. Exemplary and non-exhaustive mobile computing devices are mobile radio devices, in particular mobile phones or smartphones, PDAs and tablet computers. Preferably the mobile computing device used may be a device which the user has in his possession at any rate, such as a smartphone. Preferably this is not a radio frequency identification (RFID) transponder or a smartcard.

A first identifier may be installed on the network device in any given manner. It is merely necessary for the identifier to be detected by a mobile computing device. For example, it may be necessary for the first identifier to be visibly installed.

The first identifier is preferably a unique code which is unequivocally assigned to the respective network device. In other words the network device may be unequivocally identified by way of the first identifier.

Furthermore the detecting mobile computing device comprises a second identifier. The second identifier is preferably a unique code, which is unequivocally assigned to the mobile computing device. In other words, the mobile computing device can be unequivocally identified by way of the second identifier. This second identifier may for example be stored in a memory which cannot be manipulated.

Following detecting the first identifier the mobile computing device preferably automatically transmits the first identifier together with the second identifier to the server.

The server is configured to compare the received second identifier with the second identifiers stored in the database. For example, the second identifiers may have been detected in a previous registration step. In particular the second identifiers of mobile computing devices assigned to authorized users can be registered in advance, in order to permit authorized users to release at least one function of the network device by means of the registered mobile computing device.

For a positive comparison result where the received second identifier matches a stored second identifier or corresponds to a second identifier, the network device may be released. Releasing a network device means that at least one function or action of the network device is unblocked, i.e. that it can be performed.

The server can identify the network device in particular by way of the first identifier. The network device can then be preferably released via the network. For example, the server may maintain a table with all network devices and their respective first identifiers in a database. This may then be used to determine the network device to be released. Alternatively the server may derive the network device to be released directly from the first identifier.

For a negative comparison result the release of the network device is prevented. This may be communicated to the user, for example, in an error message which can be sent to the mobile computing device.

In a simple and at the same time secure way, a secured network device may be released by means of a mobile computing device. In particular a user-friendly method is made available.

According to a first embodiment of the method according to the invention the first identifier may be a barcode, in particular a two-dimensional barcode. A barcode can be very simply generated and installed on one, preferably on all network devices to be released. It is understood that every network device can be provided with an unequivocal and unique barcode. For example, a barcode may glued on or printed on. It is also possible to show a barcode on a display provided on the network device at any rate. Additional communication means such as radio transmitters or radio receivers are not necessary. In particular already existing network systems or network devices may retrofitted in a simple manner.

In principle the first identifier may be detected in various ways. According to a preferred exemplary embodiment the first identifier may be detected by the mobile computing device by photographing it. The mobile computing device may, for example, comprise a camera. The user can therefore detect the identifier of the network device which preferably is a barcode in a simple manner by means of the mobile computing device. In particular modern mobile radio devices such as smartphones or tablet computers comprise a camera at any rate. Additional elements do not need to be installed.

In order to effect a release of the network device in a simple way a release signal may be transmitted from the server to the network device. Preferably the release signal can be transmitted via the existing network. The release signal may comprise data which are suitable for releasing at least one action or function of the network device.

For example, the item to be released may be merely a print job. The print job may be created by the user in a conventional manner and provided with a third identifier. The print job may be received in the printing device or a print server. The release signal may comprise, in particular, a third identifier assigned to the user. Then the network device can compare the received identifier with the identifier associated with the print job. For a positive comparison result the print job can be executed by the printing device. For a negative comparison result the print job remains blocked.

As has already been described the second identifier may in particular, be assigned uniquely and unequivocally to the mobile computing device. For example a second identifier can be generated and preferably stored in a read-only memory (ROM). According to a preferred embodiment of the method according to the invention the second identifier may be a serial number, in particular an IMEI (International Mobile Station Equipment Identity). By using an identifier already provided in the mobile computing device an additional generating and/or storing step may be omitted. Furthermore the IMEI may be used to unequivocally identify any mobile device. A high level of security can be guaranteed.

A second aspect of the present invention is a method for registering a mobile computing device in a network system with at least one network system and at least one server. The method comprises the following steps:

Transmitting a third identifier assigned to the user from a network device to a server, Transmitting a code to the network device, wherein the code together with the third identifier is stored in a database of the server, Detecting the code transmitted to the network device from a mobile computing device, Transmitting the detected code and a second identifier assigned to the mobile computing device to the server, Comparing the received code with the at least one code stored in the database, and Storing the third identifier together with the second identifier in the database for a positive comparison result.

This independent inventive method, in contrast to the state of the art, permits a user-friendly and secure registration of a mobile computing device, which may be used, for example, for releasing a network device in accordance with the above-described method.

The method may, for example, be started by a user on a network device. A network device transmits the third identifier to a server preferably over a network. The third identifier may be code. This code is assigned, in particular, uniquely and unequivocally to the user. In other words, due to the third identifier the user can be unequivocally identified.

In particular following receipt of the third identifier the server can generate a code and in answer transmit this code to the network device or transmit a provided code to the network device. Furthermore the code may be unique and preferably unequivocally assigned to the third identifier. The code such as a copy of the code or a code unequivocally corresponding to the code can be stored together with the third identifier in a database of the server.

The code received from the network device may be provided by the same in such a way that it can be detected by means of the mobile computing device. In principle the code may be detected in any way possible. For example, the code may be detected automatically by means of the mobile computing device or as a result of a user action.

The mobile computing device may be configured so as to associate the code with a second identifier. As already mentioned the second identifier may be unique and unequivocally identify the mobile computing device.

The code may be transmitted together with the second identifier from the mobile computing device to the server. The server is configured so as to compare the received code with the at least one code stored in the database. For a positive comparison result, the second identifier is stored in the database. In particular the second identifier is stored together with the third identifier. In other words the mobile computing device is (centrally) registered.

The method permits a user-friendly and at the same time secure registration of a mobile computing device of a user.

According to a first embodiment of the method according to the invention the code may be a random number in particular in the form of a barcode. A random number can be generated and transmitted in a simple manner.

The code may, in principle, be detected in various ways by the mobile computing device. According to a preferred embodiment of the method according to the invention the code for being detected by means of the mobile computing device may be indicated by the network device. The network device may comprise a suitable indicating device or may be connected with an indicating device. The indicating device in particular may be a suitable display. A particularly simple way is to display a random number in the form of a barcode, in particular a two-dimensional barcode. It is understood that also characters etc. may be used as a code.

The displayed code, in accordance with a further embodiment, may be detected by means of the mobile computing device by way of taking a photograph. The mobile computing device can, for example, comprise a camera. Thus a user can, in a simple way, detect the code which is preferably a two-dimensional barcode by means of the mobile computing device. Modern mobile devices, in particular, comprise a camera.

The second identifier, in particular, may be uniquely and unequivocally assigned to the mobile computing device. For example, a second identifier may be generated and preferably stored in a ROM memory. According to a preferred embodiment the second identifier may be a serial number, in particular an IMEI (International Mobile Station Equipment Identity). By using an identifier which is provided at any rate. By using the IMEI unequivocal identification is possible from any mobile device. A high level of security can be guaranteed.

Moreover, according to a further embodiment of the method according to the second aspect an authentication of a user may be performed at the network device prior to transmitting the third identifier from the network device to the server. For example, a user may be requested to enter a third identifier such as a unique and unequivocal username and a key. Registration is only possible if the user can show that he is authorized by means of a successful authentication.

It should be noted that a unique identifier or a unique code should be understood to mean that this identifier or this code has been used (only) once in the at least one network system and is assigned to only one entity.

A further aspect of the present invention is a computer program with instructions executable on a processor such that a network device is released by means of the above-described method and/or a mobile computing device is registered by means of the above-described method. Preferably a computer program can be provided which initially permits registration and then permits a release. Alternatively two separate computer programs may be provided.

A further aspect of the present invention is a computer program product comprising an above-described computer program with instructions executable on a processor such that a network device is released by means of above described method and/or a mobile computing device is registered by means of the above described method. Preferably a computer program product including a computer program may be provided which initially permits registration and then permits a release. Alternatively two separate computer program products including separate computer programs may be provided.

Now a plurality of possibilities exist to configure and further develop the method according to the invention for releasing a network device in a network system, to configure and further develop the method according to the invention for registering a mobile computing device in a network system, to configure and further develop the computer program according to the invention and the computer program product according to the invention. To this end reference is made, on the one hand, to the patent claims subordinate to the independent patent claims, and on the other, to the description of embodiments in conjunction with the drawing, in which:

DETAILED DESCRIPTION

Figure 1:
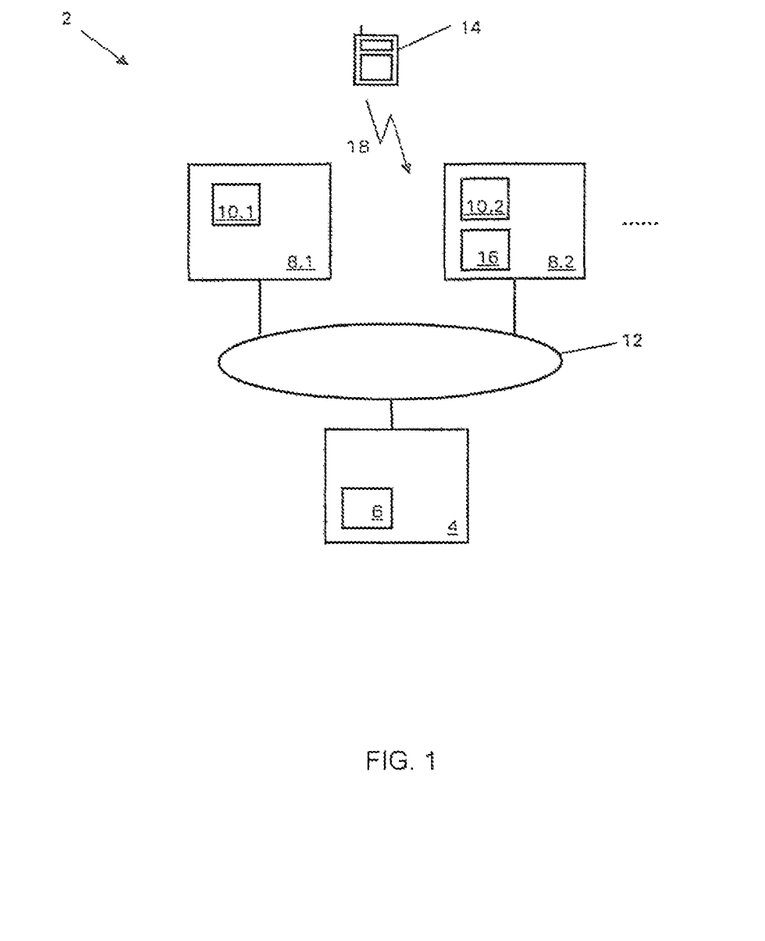
FIG. 1 shows a schematic view of an exemplary embodiment of a network system according to the invention.

FIG. 1 shows as schematic view of an exemplary embodiment of a network system 2 according to the present invention.

The illustrated network system 2 comprises at least one server 4. The server 4 may be configured as a computer 4 and comprise a processor, storage means, interfaces etc. In particular the server 4 may comprise at least one database 6.

It is understood that the server 4, according to other variants of the invention, may also be connected with a remotely arranged database and/or in that two or more databases may be provided. It is also understood that two or more servers may be provided in a network system.

In addition the network system 2 comprises at least one network device 8.1, 8.2. The network device 8.1, 8.2 in particular is a resource which can be used by at least one user. For example, the network device 8.1 may be a client computer which can be used by one or more users. A client computer may be a conventional PC, a notebook etc. The network device 8.2 may be a resource shared for example by several client computers, such as a printing device, a scanning device, a copying device and/or a faxing device.

In the present exemplary embodiment two network devices 8.1 and 8.2 are shown. For the example a client computer 8.1 and a network printer 8.2 may be provided. It is understood that the network system 2 may comprise a plurality of (different) network devices.

A client computer 8.1 in particular may comprise a display 10.1. For example, the client computer may be connected with a screen 10.1. Further, a client computer 8.1 may comprise a processor, storage means, interfaces etc.

A printing device 8.2 may also have an indicating device 10.2 for example in the form of a display and comprise a processor, storage means and interfaces. Furthermore the printing device 8.2 may have an indicating device 16 arranged on it, which in particular may display a first identifier. The indicating device 16 may be the display 10.2, or another display, or it may comprise a surface for attaching a first identifier, for example in the form of a sticker or the like. The first identifier is preferably a unique identifier and is unequivocally assigned to the printing device. It is understood that according to other variants of the invention all network devices may each comprise a first identifier.

The network devices 8.1 and 8.2 may be connected with each other and/or with the server 4 via a network 12. The network 12 may be local or a non-local network 12. In addition the network may be a wireless or a wired network 12. Typical networks 12 are a local area network (LAN), a wireless LAN (WLAN), a wide area network (WAN), etc. It is understood that different sub-networks can be combined to form a network 12.

As can be seen in FIG. 1, the network system 2 comprises at least one mobile computing device 14. The mobile computing device 14 such as a smartphone, a personal digital assistant (PDA), a portable computer, e.g. a laptop or a tablet computer, may be assigned to a user of the network system 2. For example each user of the network system 2 may have at least one mobile computing device 14.

The mobile computing device 14 comprises at least one suitable interface in order to e.g. communicate at least with the server 4 via the network 12 or another communication channel 18. Further the mobile computing device 14 may comprises in particular detecting means such as a camera.

The method for operating, in particular for securely operating the network system according to FIG. 1 will now be described in detail with reference to FIGS. 2 and 3.

Figure 2:
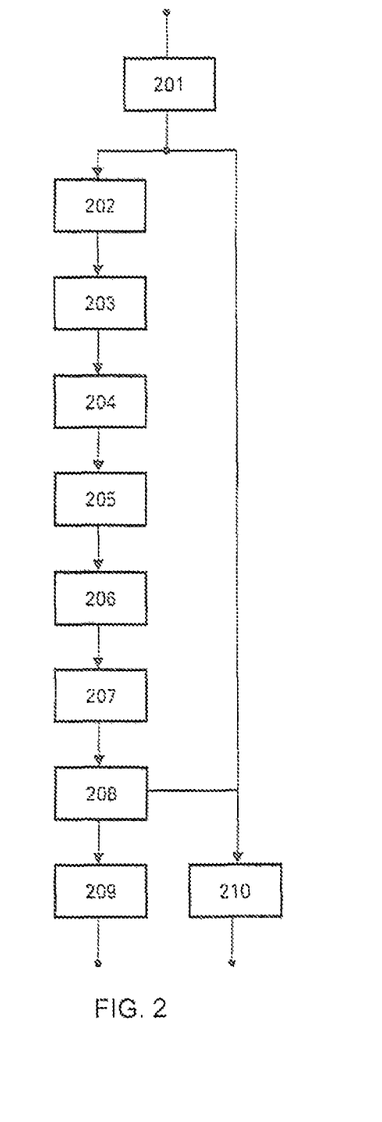
FIG. 2 shows a flow diagram of an exemplary embodiment of a method for registering a mobile computing device in a network system according to the present invention.
Figure 3:
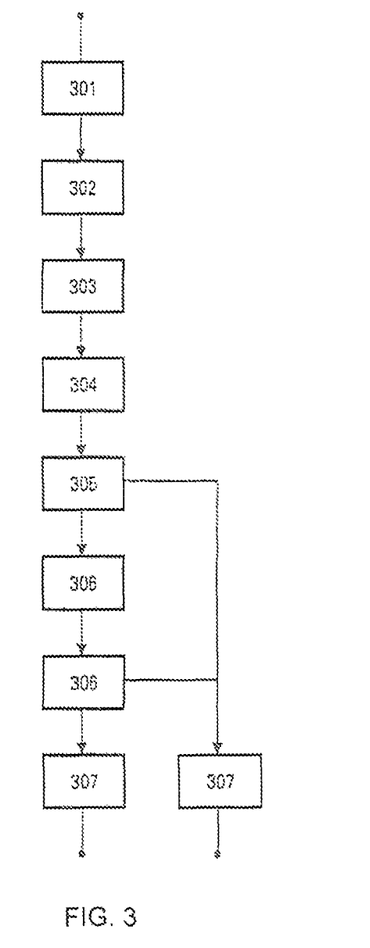
FIG. 3 shows a further flow diagram of an exemplary embodiment of a method for releasing a network device according to the present invention.

FIG. 2 shows a first exemplary embodiment of a method for registering a mobile computing device 14 in a network system 2. For example a mobile computing device 14 of an authorized user may be registered in order to release blocked network devices 8.1, 8.2 for the user by means of the registered computing device 14. To this end it is necessary to centrally store an identifier of the mobile computing device 14, i.e. to register it in order to later release a secured network device 8.1, 8.2 by way of the stored information and the mobile computing device 14.

For registering a mobile computing device 14 an authorized user may, in an optional first step 201, authenticate himself at a network device such as a client computer 8.1 or a network printer 8.2. For example, a user in a log-on step may enter a third identifier assigned to him, such as a user name and a key, via a keypad. The key may be e.g. a password or a PIN number which is preferably known only to the user. In this way it can be ensured that only an authorized user can perform a registration at a mobile computing device 14.

Following a successful authentication the method can continue with step 202. For a negative result the user may be requested to repeat his entry and/or the method may be cancelled (step 210).

In the next step 202 the third identifier assigned to the user can be transmitted to the server 4 from the network device 8.1, 8.2. The third identifier is preferably uniquely and in particular unequivocally assigned to the user. A doubtless identification of the user is possible. Preferably the third identifier can be transmitted via the network 12. It is understood that further data may also be transmitted.

The server 4 may be configured so as to generate a code (step 203) after receiving the third unequivocal identifier. The code may be unique. For example, a random number may be generated. It is understood that a plurality of codes may be provided to the server 4 by another server thereby obviating the need for generating a code.

In a next step 204 at least the generated or provided code can be transmitted in response to the user's request or the receipt of the third identifier at the respective network device 8.1, 8.2. Furthermore in this step 204 the generated code such as the random number can be stored in a database 6 of the server 4 together with the third identifier. In particular a copy of the code or a code corresponding to the transmitted code can be stored.

It is understood that prior to transmitting the code to the network device 8.1, 8.2, the server 4 can initially perform a check. For example it can be checked whether the user is at all authorized to have a mobile computing device 14 registered. The server 4 may, for example, search in a database 6 for the third identifier. For example it may be checked whether a mobile computing device 14 is already registered for the user. If this is the case, then registration may be made dependent upon the previous registration being deleted. If the result is positive, the code can be transmitted.

Once the network device 8.1, 8.2 has received the code, the code can be detected (step 205) by the mobile computing device 14 to be registered.

In principle the code can be detected in various ways by the mobile computing device 14. For example, the mobile computing device 14 may be configured to (automatically) read the code from the network device 8.1, 8.2 via a wireless or wired connection. For example, a Bluetooth connection may be established between the network device 8.1 and the mobile computing device 14.

Alternatively a code may be made available and displayed e.g. in the form of characters which can be manually entered by a user into the mobile computing device 14.

It is especially preferred if the transmitted code is indicated as a two-dimensional barcode on a display 10.1, 10.2 of the network device 8.1, 8.2. Such a code can be detected in a particularly simple manner by taking a photograph using the mobile computing device 14. In particular modern mobile computing devices 14 normally comprise a camera enabling the user to take a photograph of the code from the indicating device 10.1, 10.2. There is therefore no need, neither for a communication link between the mobile computing device 14 and the network device 8.1, 8.2, nor is it necessary to perform a manual entry which can easily result in faulty detection.

Following detection of the code by the mobile computing device 14 a second identifier assigned to the mobile computing device 14 can be associated with the code in step 206. This can be done by loading a suitable application onto the mobile computing device 14. After starting the application the code, for example, can be initially detected by taking a photograph (step 205) and the second unequivocal identifier can automatically be read (step 206) from the mobile computing device 14. The second identifier can preferably uniquely and in particular unequivocally, be assigned to the mobile computing device 14. The second identifier may preferably be a serial number firmly connected with the mobile computing device 14. In particular an IMEI identifier may be used.

In a next step 207 the code and the second identifier of the mobile computing device 14 may be transmitted to the server 4. Preferably the application of the mobile computing device 14 can cause the code to be automatically sent together with the unequivocal second identifier. The data can be transmitted e.g. via the network 12 or another communication channel 18. Another communication channel 18 is preferably chosen in order to ensure a higher level of security.

Once the server 4 has received the second identifier and the code, the database 6 can be searched in a next step 208. In particular a previously stored code (step 204) can be searched for which matches the received code or corresponds to the code. In case the code generated or provided is a random number (step 203) the server 4 may, in particular, be configured so as to check whether the random number received from the mobile computing device 14 matches the stored random number.

If the result of the check is positive the found third identifier associated with the stored code, and the second identifier associated with the received code can be assigned to each other (step 209). In other words the user ID can be unequivocally assigned to a second identifier of the mobile computing device 14 of a user. The assignment of the two identifiers can be stored in the database 6. The code may, for example, be deleted and/or re-used for a further registration.

In addition further data can be stored such as time data together with the two identifiers. Also different authorization stages can be defined and linked with the corresponding data. As such there may be a stage to which users have been assigned, which are allowed to operate all network devices 8.1, 8.2. There may also be a further stage which allows users to only access certain network devices 8.1, 8.2. In this case identifiers of the corresponding approved network device 8.1, 8.2 may e.g. also be stored. Further, certain users may only have authorization for executing certain functions of a network device 8.1, 8.2, such as the authorization to print on a multi-function device, but not to fax from it. This too can be stored in the database 6.

In case the received code does not match the stored code an error message may be sent to the network device 8.1, 8.2 or the mobile computing device 14. The registration process may be aborted (210).

It is understood that communication between the various devices can preferably be at least partially encoded. This may prevent that codes are spied out.

Following successful registration which in principle can be carried out also in another manner than that described, a user can release and operate a secured network device 8.1, 8.2 such as a printing device 8.2 in a simple manner, using his registered mobile computing device 14.

The method for releasing a secured network device 8.1, 8.2 will now be described in detail with reference to FIG. 3. FIG. 3 shows a further flow diagram of a further exemplary embodiment of a method for releasing the network device 8.1, 8.2 according to the present invention.

In particular the network device 8.1, 8.2 to be operated may be a secured network resource. A secured network resource is characterized in that authentication is required for releasing the resource. In the exemplary embodiment the network device 8.2 on which the example is based, is a printing device 8.2.

For example, say a user has generated a print job in a conventional manner and has sent it to the secured printing device 8.2 for printing. In order to prevent a third party from gaining knowledge of the content of the print job it is necessary for the user to be in the immediate vicinity of the printing device 8.2 during printing and to authenticate himself to the same so that the printing device 8.2 or the print operation can be released.

Releasing the printing device 8.2 or the print job can be effected by the user using his registered mobile computing device 14.

In a first optional step 301 the user can select his print job from a list of jobs, wherein the print job in particular may be associated at least with a third identifier assigned to the user.

In a next step 302 the user, by means of a previously registered mobile computing device 14, can detect a first identifier installed at the printing device 8.2. As already described the first identifier may for example be a two-dimensional barcode. The first identifier may for example be displayed on an indicating device 16. The printing device 8.2 may have a corresponding identifier printed on it. The first identifier may be installed in a particularly easy manner on the printing device 8.2 in the form of a sticker.

Preferably the first identifier, in particular a barcode, can be detected by taking a photograph. The mobile computing device 14 may include a corresponding application which allows the first identifier to be photographed. Again, it is understood that the first identifier may also be detected in another manner, for example manually.

In a next step 303 a second identifier assigned to the mobile computing device 14 may be read from the mobile computing device 14. For example, this may be (automatically) effected by an application. The detected first identifier and the second identifier, for example a serial number, such as an IMEI identifier, may be associated with each other.

Subsequently, in a step 304, the corresponding data, i.e. the two identifiers, may be transmitted from the mobile computing device 14 to the server 4. For example, the identifiers may be transmitted via a wireless communication channel 18. As already described above, third user identifiers have been stored together with second identifiers of the users' mobile computing devices in a data base 6 as a result of a previous registration process. Further the database 6 may also have the first identifiers of preferably all network devices 8.1, 8.2 stored in it. For example, all first identifiers may have been stored together with the corresponding network address of the network devices 8.1, 8.2.

On receipt of the first and second identifiers the server 4 may initially search the database 6. In particular the server 4 can check, whether the second identifier is a valid identifier, i.e. a registered identifier (step 305). To this end the database 6 may be searched for an identical second identifier. If the result of the check is positive, the user identifier, i.e. the third identifier, may be read from the database 6.

Further the first identifier may be used to determine which network device 8.1, 8.2 shall be released. Following the determination of the network device 8.1, 8.2 to be released, a check may be carried out in an intermediate step, whether the user is authorized to operate the corresponding network device 8.2. As already described, different authorization stages can be defined so that the authorization of certain users can for example be restricted to certain functions and/or certain network devices 8.1, 8.2. This information may preferably be stored in the database 6.

If this optional check is also positive the server 4 may send a release signal via the network 12 to the printing device 8.2 to be released (step 306).

For a negative result an error message can be sent to the printing device 8.2 and/or to the mobile computing device 14 and the operation can be aborted (step 308). For example, the user may be initially requested to register. As such the method according to FIG. 2 can be started directly from the printing device 8.2 with step 201.

To release only the print jobs assigned to the user of the mobile computing device 14, i.e. those which are for example provided with the third identifier, the release signal may comprise at least the third identifier. In a step 307 a comparison may then be carried out in the printing device 8.2 between the third identifier sent by the server 4 and the third identifiers associated with the print jobs.

It is understood that this step can also be carried out on another device such as a print server or a client computer.

For a positive result the at least one print job can be carried out on the printing device 8.2 in a step 308. For a negative result, however, the printing operation is cancelled. A corresponding error can be indicated to the user as already described above.

It is understood that the above-described method can analogously be applied to other network devices such as scanners, fax machines, etc. It is also understood that additionally further security mechanisms such as suitable encrypting processes may be provided.

The invention claimed is:

1. A method for releasing a network device of a network system, which comprises at least the one network device and at least one server, wherein the network device is a computer, printing device, scanner, copier and/or fax machine, wherein at least one second identifier assigned to a mobile computing device is stored in a database of the server, wherein the second identifier is a unique code, which is unambiguously assigned to the corresponding mobile computing device, comprising:
    detecting a first identifier installed on the network device by means of the mobile computing device, wherein the network device is unequivocally identified by way of the first identifier,
    transmitting the detected first identifier and the second identifier assigned to the detecting mobile computing device from the mobile computing device to the server,
    comparing the transmitted second identifier with the at least one second identifier stored in the database, and
    releasing the network device through the server if the result of the check is positive,
    wherein for releasing the network device, a release signal is transmitted from the server to the network device.

2. The method according to claim 1, characterized in that the first identifier is a barcode, in particular a two-dimensional barcode.

3. The method according to claim 1, characterized in that the first identifier is detected by taking a photograph with the mobile computing device.

4. The method according to claim 1, characterized in that the release signal comprises a third identifier assigned to the user.

5. The method according to claim 1, characterized in that the second identifier is a serial number, in particular an international mobile station equipment identity.

6. A method for registering a mobile computing device in a network system having at least one network device and at least one server, comprising:
    transmitting a third identifier assigned to a user from a network device to a server,
    transmitting a code to the network device, wherein the code together with the third identifier is stored in a database of the server,
    detecting the code transmitted to the network device by means of a mobile computing device,
    transmitting the detected code and a second identifier assigned to the mobile computing device to the server,
    comparing the received code with the at least one code stored in the database, and
    storing the third identifier together with the second identifier in the database if the result of the check is positive.

7. The method according to claim 6, characterized in that the code is a random number, in particular in the form of a barcode.

8. The method according to claim 6, characterized in that the code to be detected by the mobile computing device is displayed by the network device.

9. The method according to claim 8, characterized in that the indicated code is detected by taking a photograph using the mobile computing device.

10. The method according to claim 6, characterized in that the second identifier is a serial number, in particular an international mobile station equipment identity.

11. The method according to claim 6, characterized in that prior to transmitting the third identifier from the network device to the server an authentication of a user is carried out on the network device.

12. A computer program with instructions executable on a processor such that a network device is released by means of the method for releasing a network device of a network system, which comprises at least the one network device and at least one server, wherein the network device is a computer, printing device, scanner, copier and/or fax machine, wherein at least one second identifier assigned to a mobile computing device is stored in a database of the server, wherein the second identifier is a unique code, which is unambiguously assigned to the corresponding mobile computing device, comprising:
    detecting a first identifier installed on the network device by means of the mobile computing device, wherein the network device is unequivocally identified by way of the first identifier,
    transmitting the detected first identifier and the second identifier assigned to the detecting mobile computing device from the mobile computing device to the server,
    comparing the transmitted second identifier with the at least one second identifier stored in the database, and
    releasing the network device through the server if the result of the check is positive,
    wherein for releasing the network device, a release signal is transmitted from the server to the network device.

13. The computer program of claim 12 wherein said program is a commercial product comprising a computer program with instructions executable on a processor.

14. Server, comprising:
    a database, wherein at least one second identifier assigned to a mobile computing device is stored in the database,
    a receiver configured to receive a detected first identifier assigned to a network device and a second identifier assigned to a mobile computing device from the mobile computing device, wherein the second identifier is a unique code, which is unambiguously assigned to the corresponding mobile computing device, wherein the network device is a computer, printing device, scanner, copier and/or fax machine, and wherein the network device is unequivocally identified by way of the first identifier,
    a comparator configured to compare the received second identifier with the at least one second identifier stored in the database, and
    a transmitter configured to release the network device if the result of the check is positive by sending a release signal to the network device.

15. A computer program with instructions executable on a processor such that a mobile computing device is registered in a network system having at least one network device and at least one server, comprising:
    transmitting a third identifier assigned to a user from a network device to a server,
    transmitting a code to the network device, wherein the code together with the third identifier is stored in a database of the server, detecting the code transmitted to the network device by means of a mobile computing device, transmitting the detected code and a second identifier assigned to the mobile computing device to the server, comparing the received code with the at least one code stored in the database, and storing the third identifier together with the second identifier in the database if the result of the check is positive.

16. A computer program of claim 15 wherein said program is a commercial product comprising a computer program with instructions executable on a processor.

* * * * *